(12) United States Patent
Tzarum et al.

(10) Patent No.: US 8,336,667 B2
(45) Date of Patent: Dec. 25, 2012

(54) TIRE VALVE ASSEMBLY, SYSTEM AND APPARATUS FOR DEFLATING A TIRE FOLLOWING UNAUTHORIZED ACCESS TO A MOTOR VEHICLE

(76) Inventors: Dror Tzarum, Herzliya (IL); Asher Tzarum, Herzliya (IL)

( * ) Notice: Subject to any disclaimer, the term of this patent is extended or adjusted under 35 U.S.C. 154(b) by 767 days.

(21) Appl. No.: 11/996,864

(22) PCT Filed: Jul. 27, 2006

(86) PCT No.: PCT/IL2006/000877
§ 371 (c)(1),
(2), (4) Date: Jun. 19, 2009

(87) PCT Pub. No.: WO2007/013082
PCT Pub. Date: Feb. 1, 2007

(65) Prior Publication Data
US 2009/0293960 A1 Dec. 3, 2009

(30) Foreign Application Priority Data
Jul. 28, 2005 (IL) .......................................... 169970

(51) Int. Cl.
*B60R 25/00* (2006.01)
(52) U.S. Cl. .................. 180/287; 116/34 R; 137/68.11; 152/415
(58) Field of Classification Search .................. 180/287; 116/33, 34 R; 340/442–448; 137/68.11–68.18; 301/5.24; 152/415
See application file for complete search history.

(56) References Cited

U.S. PATENT DOCUMENTS

| 1,335,827 | A | * | 4/1920 | Finn ................................ 116/33 |
| 3,003,539 | A | | 10/1961 | Tone |
| 3,688,257 | A | | 8/1972 | Mann |
| 4,375,200 | A | * | 3/1983 | Bertani et al. .................... 116/8 |
| 4,657,057 | A | * | 4/1987 | Ha ................ 152/415 |
| 4,818,029 | A | | 4/1989 | Mourot et al. |
| 4,969,342 | A | | 11/1990 | Marchiori |
| 5,090,223 | A | | 2/1992 | Ruffler |
| 5,419,408 | A | | 5/1995 | Ellrodt et al. |
| 5,921,265 | A | * | 7/1999 | Rothman ........................ 137/38 |
| 5,942,971 | A | | 8/1999 | Fauci et al. |
| 6,068,076 | A | | 5/2000 | Stancliffe et al. |
| 6,148,840 | A | * | 11/2000 | Rothman ........................ 137/38 |

FOREIGN PATENT DOCUMENTS
DE 40 14 378 A1 11/1991

* cited by examiner

*Primary Examiner* — Ruth Ilan
(74) *Attorney, Agent, or Firm* — Merchant & Gould P.C.

(57) ABSTRACT

Apparatus deflates a tire following unauthorized access to a motor vehicle. In one embodiment, a self-damaging tire valve assembly is capable of being damaged to such a degree by damage inflicting apparatus in close proximity to the valve assembly that air escapes from the corresponding tire. An activation device housed within the damage inflicting apparatus, when activated, following unauthorized access of a motor vehicle is able to damage the body and grommet of the valve assembly without damaging the tire rim. In one embodiment, a processor transmits an activation signal to a wireless switch following reception of an unauthorized access signal when the motor vehicle is in an armed state. In one embodiment, a housing containing the tire deflating apparatus is in contact with the valve assembly, and the tire deflating apparatus is activated to cause the tire to be deflated following unauthorized access of the motor vehicle.

33 Claims, 14 Drawing Sheets

TIRE VALVE ASSEMBLY, SYSTEM AND APPARATUS FOR DEFLATING A TIRE FOLLOWING UNAUTHORIZED ACCESS TO A MOTOR VEHICLE

FIELD OF THE INVENTION

The present invention relates to the field of car theft deterrent devices. More particularly, the invention relates to an apparatus and system for disabling a vehicle following unauthorized access thereto by deflating one or more tires.

BACKGROUND OF THE INVENTION

Automobile anti-theft devices for causing deflation of tires when the engine is started without use of the ignition key are well known. For example, U.S. Pat. No. 3,688,257 discloses an apparatus which comprises a probe extending through a bore in the corresponding wheel rim and adapted to strike, following tire rotation, against a plunger, which is retractable by means of an ignition-energized solenoid. When the solenoid is not energized, the probe strikes the extended plunger and breaks, whereby an opening is produced and air escapes to deflate a tire. The drawback of such an apparatus is that the rim needs to be modified by producing a bore therethrough, in order to accommodate the probe.

Similarly with respect to the vehicle theft prevention device of U.S. Pat. No. 6,068,076, by which a solenoid controlled valve is opened to allow air to escape from a tire when a motion detector detects motion when the device is armed, the wheel needs to be modified by boring a hole in an inner portion thereof to accommodate the solenoid controlled valve, and with respect to U.S. Pat. No. 4,818,029, by which the deflating means is moved by the centrifugal force of inertia when the wheel rotates, opening an orifice and allowing air to escape, the device needs to be rigidly connected to the rim.

U.S. Pat. No. 5,942,971 discloses an anti-theft tire disabling device that comprises a wheel mounted unit and at least one remote unit for deactivating the wheel mounted unit via remote signals. The wheel-mounted unit is automatically armed when the vehicle stops and comprises a pressure release assembly, which is mounted in an orifice of the wheel that is not factory produced, for deflating the tire, a sensor adapted to sense wheel rotation and wheel speed, and a controller connected to the sensor and pressure release assembly.

U.S. Pat. No. 5,419,408 discloses an anti-theft tire deflating device which punctures the tire during unauthorized use.

U.S. Pat. No. 5,090,223 discloses a vehicle theft deterrent device which includes a latching assembly threadably connected to the valve stem of the tire and a break-away-bar assembly positioned about the tire. Rotation of the tire causes the bar assembly to rip the valve stem out of its seat and to permit relatively rapid escape of air from the tire. Although the wheel remains intact after the valve stem is damaged and does need to be modified, the costly apparatus needs to be procured and to be subsequently arranged in a locked condition by a relatively time consuming procedure each time the vehicle is parked.

U.S. Pat. No. 4,969,342 discloses an anti-theft device for motor vehicles, by which a collar of the anti-theft device is secured to the valve stem of a tire, and a locking device is detachably secured to the collar. A cable carrier mounted on a supporting structure of a motor vehicle is connected to the locking device, so that the valve stem isforceablv removed upon unauthorized movement or attempted theft of the vehicle, causing the tire to be deflated. The locking device is external to the tire interior and therefore exposed to thieves, who can simply sever the cable connected to the locking device and neutralize the device.

It is an object of the present invention to provide an apparatus and system for deflating a tire following unauthorized access to a motor vehicle, such as by starting the engine without use of an engine key.

It is an additional object of the present invention to provide an apparatus and system for deflating a tire following unauthorized access to a motor vehicle that can be mounted without requiring modification to the wheel rim or to the tire.

It is an additional object of the present invention to provide an apparatus and system for deflating a tire following unauthorized access to a motor vehicle without causing irreversible damage to the tire.

It is an additional object of the present invention to provide an apparatus and system for deflating a tire following unauthorized access to a motor vehicle that does need to be set after a vehicle is parked.

It is an additional object of the present invention to provide an apparatus for deflating a tire following unauthorized access to a motor vehicle, which is retained within the tire interior.

It is yet an additional object of the present invention to provide an apparatus and system for deflating a tire following unauthorized access to a motor vehicle that does not significantly add to the cost of the wheel or of the motor vehicle.

Other objects and advantages of the invention will become apparent as the description proceeds.

SUMMARY OF THE INVENTION

The present invention provides a self-damaging tire valve assembly which prevents malicious people from driving a motor vehicle from a parking space without authorization. Following unauthorized access of the motor vehicle as detected by a suitable sensor, an activation signal is generated and transmitted to suitable apparatus associated with each tire valve assembly of the motor vehicle. Each activation signal triggers the operation of one or more devices which are adapted to damage a corresponding valve assembly and to deflate the corresponding tire. The term "unauthorized access" as referred to herein means an operation performed without authorization of the owner of the motor vehicle or a designated representative thereof that compromises the security or safety of, or the ability to use, the motor vehicle, such as igniting the engine without use of a key, breaking into the motor vehicle while damaging a structural element thereof, e.g. a window, towing the motor vehicle, detaching or removing the anti-theft protection system of the motor vehicle, and the like.

Accordingly, the self-damaging tire valve assembly of the invention is provided with a valve assembly and damaging apparatus, said valve assembly capable of being damaged to such a degree by said damaging apparatus being disposed in close proximity to said valve assembly that air escapes from the corresponding tire, said apparatus being activatable following unauthorized access of a motor vehicle.

Since the damaging apparatus is retained in the interior of a tire, a thief cannot detach the damaging apparatus without replacing each tire valve assembly, an operation which is time consuming and which requires specialized equipment not usually accessible to thieves. Employment of self-damaging tire valve assemblies of the present invention therefore considerably increases the anti-theft protection of motor vehicles, and may obviate the need of an anti-theft protection system.

The tire valve assembly preferably comprises:
a) an elongated valve stem having a stem wall longitudinally extending through the valve assembly and an externally threaded portion at a proximal end of said stem wall which is engageable with a removable closure cap, said stem wall being formed with a bore through which air is flowable;
b) a valve core engaged with the interior of said stem wall adjacent to said externally threaded portion;
c) a grommet disposed externally with respect to said stem wall and provided with an enlarged distal portion which is formed with a central opening in communication with said bore, said grommet being adapted to contact a tire rim in sealing relationship when said valve stem is mounted in a suitable factory-produced aperture of the rim; and
d) damaging apparatus housed within, or mounted externally to, said valve assembly body and is adapted, following generation of an activation signal upon access to a motor vehicle by an unauthorized person, to selectively damage said body and said grommet, without damaging the tire or tire rim, to such a degree that air escapes from the corresponding tire.

Since a tire or tire rim is not damaged after activation of the damaging apparatus, the cost of a self-damaging tire valve assembly to a vehicle owner is relatively low. Further savings may be realized by reusing the damaging apparatus in conjunction with an intact tire valve assembly after a first tire valve assembly has been damaged by said damaging apparatus.

The apparatus housed within, or mounted externally to, the valve assembly comprises an activation device for selectively damaging the body and grommet when activated, a switch, which is preferably a wireless switch, in communication with said activation device, and means for powering said activation device and/or said switch, said switch being adapted for receiving a suitable activation signal and for activating said activation device following reception of said activation signal.

In one embodiment of the invention, the valve assembly body is a hollow body in which the damaging apparatus is housed and to the exterior of which the grommet is fixedly affixed, said hollow body surrounding and integrally formed with the stem wall and extending outwardly from the stem wall at a connection point which is disposed distally with respect to the externally threaded portion.

In one embodiment of the invention, the grommet is fixedly affixed to the stem wall and the damaging apparatus has an annular housing mounted externally to the grommet, said annular housing being provided with an outer portion in which is housed the activation device and the switch and an inner portion securable to the tire rim by means of the enlarged distal portion of the grommet upon mounting of the valve assembly onto the tire rim, said inner portion internally protruding from, and having a significantly smaller thickness than, said outer portion. A portion of the outer portion of the annular housing is formed with an aperture through which a suitable component of the activation device is in damage inflicting communication with the valve assembly following generation of an activation signal.

In one aspect, the activation device comprises an electric detonator which is suitable for generating a suitable explosive force that can rupture the corresponding tire without damaging the corresponding tire rim.

In one aspect, the activation device comprises a motor, an actuator for said motor in data communication with the switch, and a bit driven by said motor for piercing the body and grommet. The motor is preferably bi-directionally operational and the bit is sufficiently long so as to be able to pierce the body and grommet when fully extended in one direction and to be able to pierce the stem wall when fully extended in the opposite direction.

In one aspect, the activation device comprises a pneumatically actuated guillotine for slicing the grommet and body.

In one aspect, the activation device comprises a heating element for melting the grommet and body.

In one aspect, the activation device comprises means for releasing a chemical agent that is capable of damaging the valve assembly to such a degree that air escapes from the corresponding tire.

In one aspect, the means for powering the activation device and/or said switch is a battery.

In one aspect, the means for powering said activation device and/or said switch is a rectified excitation circuit.

In one aspect, the damaging apparatus is reusable after the valve assembly is damaged.

The tire valve preferably comprises safety apparatus in communication with the wireless switch for preventing the operation of the activation device while the motor vehicle is in transit. The safety apparatus comprises a vehicle movement sensor or a vehicle vibration sensor connected to a controller, said controller adapted to receive a disable signal from one or more of said sensors indicating that the motor vehicle is in transit and to thereinafter force a switch in communication with the wireless switch to remain open, thereby preventing operation of the activation device.

The present invention is also directed to a system for deflating a tire following unauthorized access to a motor vehicle, comprising:
a) a tire valve assembly mountable on a corresponding tire rim and comprising a body and grommet affixed to the exterior of said body;
b) damaging apparatus disposed in close proximity to said valve assembly;
c) an activation device housed within said damaging apparatus for selectively damaging, when activated, said body and grommet without damaging the tire rim to such a degree that air escapes from the corresponding tire;
d) a switch housed within said damaging apparatus which is in communication with said activation device;
e) means for powering said activation device and/or said switch;
f) at least one sensor for detecting unauthorized access to a motor vehicle;
g) an activation signal generator comprising a processor which is suitable for receiving an input signal indicating whether said vehicle is in an armed or disarmed state, for receiving an unauthorized access signal from said at least one sensor following unauthorized access of said vehicle, and for transmitting an activation signal to said switch following reception of an unauthorized access signal when said motor vehicle in an armed state, wherein said wireless switch is adapted for activating said activation device following reception of said activation signal.

In one aspect, the input signal is received from an anti-theft protection system of the motor vehicle.

In one aspect, the input signal is transmitted by a remote control device to an immobilizer in communication with the processor.

In one aspect, the activation signal generator is suitable for transmitting an audible warning signal to the remote control device at a predetermined time prior to the transmission of the activation signal.

In one aspect, one activation signal generator is suitable for transmitting a corresponding activation signal to each damaging apparatus of the motor vehicle.

In one aspect, each damaging apparatus of the motor vehicle comprises a corresponding activation signal generator.

In one aspect, the processor is the on-board computer.

The at least one sensor is selected from the group of vehicle movement sensor, engine ignition sensor, vehicle vibration sensor, tire rotation sensor, sensor for detecting unauthorized detachment or removal of a vehicle anti-theft protection system, sensor for detecting a predetermined vehicular speed, or a combination thereof.

The present invention is also directed to apparatus for deflating a tire following unauthorized access to a motor vehicle, comprising a tire valve assembly and a housing for tire deflating apparatus contained therein, wherein said valve assembly is insertable within a factory-produced rim aperture, a grommet provided with said valve assembly is in sealing relationship with said rim to prevent the discharge of air from said rim aperture, and said housing or a component contained within said housing is in contact with said valve assembly, said tire deflating apparatus being activatable following unauthorized access of a motor vehicle.

The apparatus is compactly configured, and the housing is only slightly wider than the grommet. Since the valve assembly has the same general dimensions as commercially available valve assemblies, the apparatus may be advantageously mounted in a factory-produced rim aperture without need of forming an additional aperture within the rim.

The tire deflating apparatus comprises an activation device for causing air to deflated from a tire when activated, a wireless switch in communication with said activation device, and means for powering said activation device and/or said switch, said switch being adapted for receiving a suitable activation signal and for activating said activation device following reception of said activation signal.

In one embodiment, the valve assembly comprises first and second valve stems longitudinally extending in opposite directions from the grommet, a central bore longitudinally extending throughout the entire interior of said valve assembly which is divided into first and second air passageways, a first valve core mounted within said first passageway and engaging the interior of said first stem, an occluding element mounted within said second passageway and engaging the interior of said second stem.

The first valve core is adapted to permit the introduction of air to the tire interior via said first passageway when actuated and to prevent the discharge of air from the tire interior when not actuated and said occluding element is adapted to permit the discharge of air externally to the tire from the tire interior via said second passageway when actuated and to prevent the discharge of air when not actuated. The activation device which is capable of contacting said occluding element is adapted to displace the same and to permit the flow of air through said second passageway.

In one aspect, the occluding element is a second valve core mounted in opposite orientation as the first valve core, said second valve core being actuatable by means of the activation device following the transmission of an activation signal to the wireless switch to permit the tire to be deflated.

In one embodiment, the valve assembly comprises a valve stem formed with external threading, a valve core installed within a bore formed within said stem, a conical grommet, a nut threadedly engaged with said valve stem threading and adapted to press said grommet onto the rim to prevent air leakage from the tire interior, and a first gear in engagement with, or connected to, a component of the valve assembly, and in engagement with a second gear driven by a motor which is disposed within the housing, The motor is operable following transmission of the activation signal, causing the valve assembly to be displaced towards the tire interior and to expose the rim aperture, whereby to deflate the tire.

DETAILED DESCRIPTION OF PREFERRED EMBODIMENTS

The present invention relates to an apparatus and system for deflating a tire following unauthorized access to a motor vehicle. While some prior art tire deflating devices cause irreversible damage to the tires following unauthorized access to a motor vehicle, the use of the present invention leaves all tires and all tire rims intact so that they may be reused. The apparatus includes a novel tire valve assembly which includes means for damaging the body and grommet thereof following ignition of the engine by an unauthorized person, as will be explained hereinafter, to such a degree that air escapes from the corresponding tire, thereby disabling the vehicle. After the tire is deflated, a new undamaged valve assembly may be easily mounted to the wheel rim, by which the tire may be inflated. While the mounting of many prior art tire deflating devices require modification to the corresponding wheel rims, wheel rim modification is unnecessary when the valve assembly of the present invention is mounted.

Figure 1:
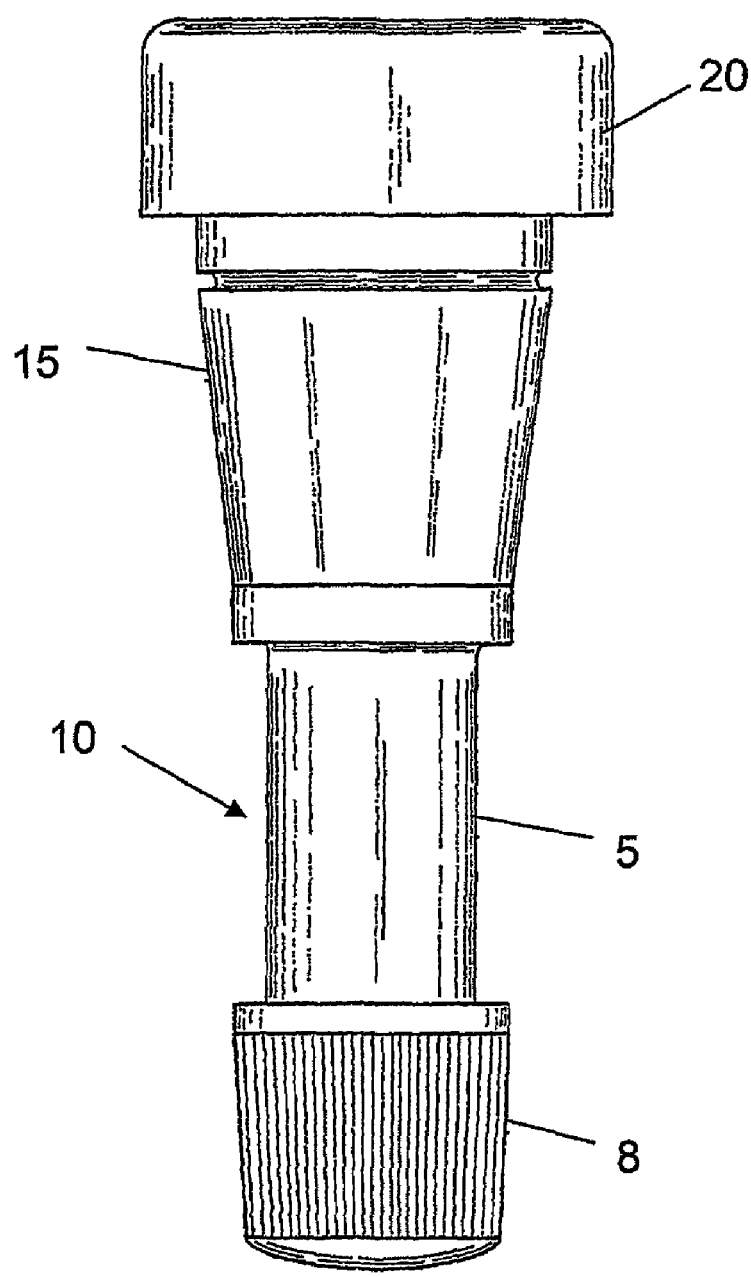
FIG. 1 is a front view of a prior art tire valve assembly.

An exemplary prior art tire valve assembly is illustrated in FIG. 1. As shown, valve assembly 10 comprises cylindrical and elongated valve stem 5, internally threaded closure cap 8 engageable with the externally threaded portion at the end of valve stem 5, a valve core (not shown) which is threadedly engaged with the interior of valve stem 5, and grommet 15 which is bonded or adhered to the exterior of valve stem 5 and includes enlarged end portion 20. The interior of valve stem 5 is formed with a bore through which air flows upon actuation of the valve core. Grommet 15 is adapted to contact a tire rim in sealing relationship when valve stem 5 is mounted in a suitable factory-produced aperture of the rim. After grommet 15 is mounted on the tire rim, the tire is inflated when the valve core is actuated and air is introduced into the bore of valve stem 5 and then exits an opening in end portion 20 which is in communication with the valve stem bore.

Figure 2:
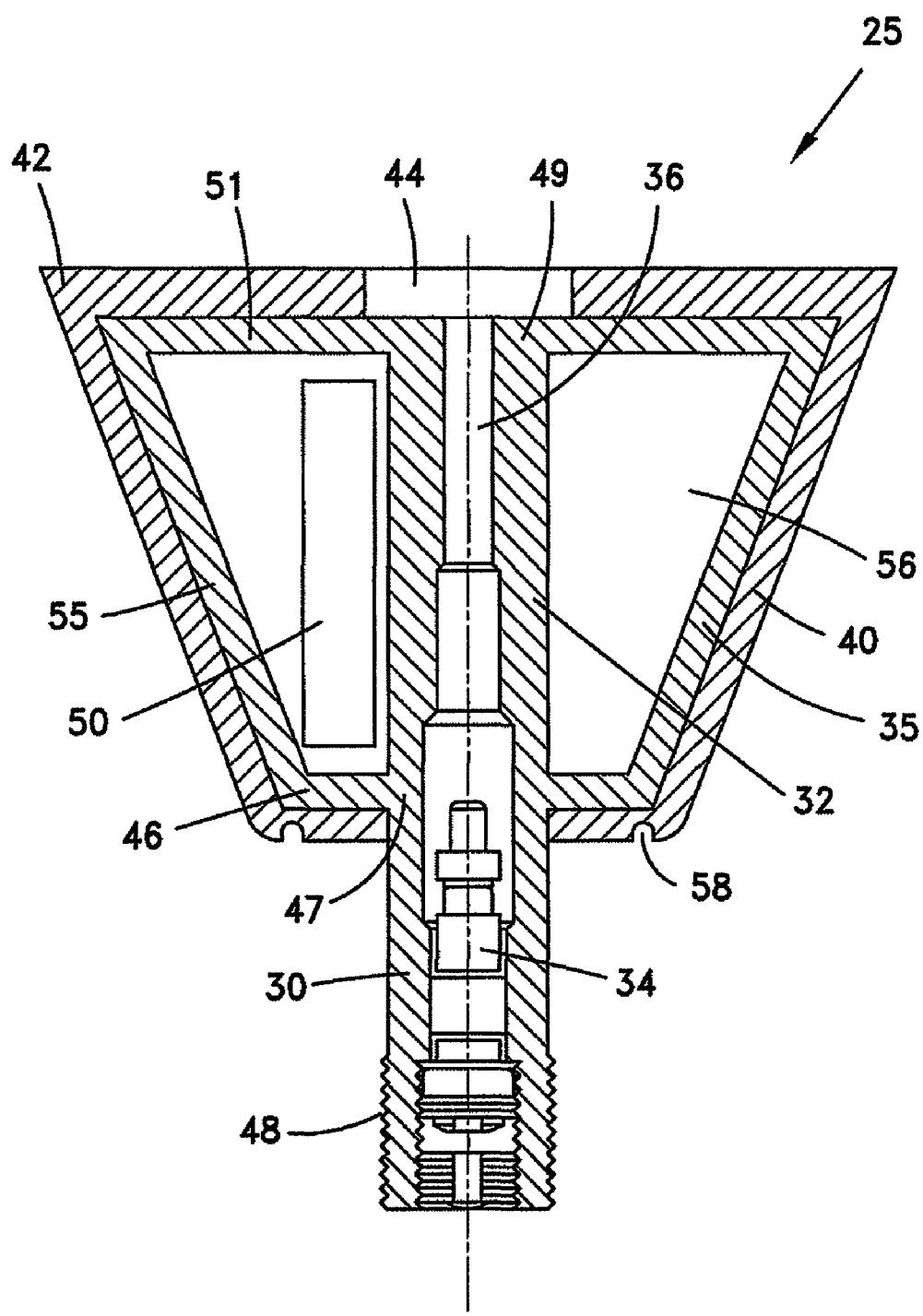
FIG. 2 is a cross-sectional view of a tire valve assembly, according to one embodiment of the invention.

FIG. 2 is a cross-sectional view of a self-damaging valve assembly according to one embodiment of the invention, which is designated generally by numeral 25. Valve assembly 25 comprises elongated and substantially cylindrical valve stem 30 longitudinally extending through the interior of the valve assembly, valve core 34 which is engaged with the interior of valve stem 30, hollow body 35 surrounding valve stem 30, grommet 40 fixedly affixed to the exterior of body 35 such as by bonding or adhesion, and schematically illustrated valve assembly damaging apparatus 50 housed within body 35. Valve stem 30 and body 35 are preferably made of a rigid plastic material and grommet 40 is preferably made of rubber.

Valve stem 30 has a stem wall 32 which is formed with bore 36 through which air is flowable. Grommet 40 having enlarged distal portion 42 which is formed with central opening 44 in communication with bore 36 is configured to contact a tire rim, such as rim 160 shown in FIG. 10, by a sealing relationship when valve stem 30 is inserted within a suitable factory-produced aperture of the rim. Recesses 58 and 59 formed in grommet 40 facilitate the mounting of grommet 40 onto the tire rim. After a tire is mounted on the rim and valve core 34 is actuated, air may be introduced to, or released from, the interior of the tire, flowing through bore 36 and central opening 44. When not actuated, valve core 34 is adapted to prevent seepage of air from the tire via valve stem 30. A removable closure cap (not shown), which may be engaged with externally threaded portion 48 formed at the proximal end of valve stem 80, additionally serves to seal valve stem 30.

Annular proximal portion 46 and distal portion 51 of body 32 extend radially outwardly from stem wall 32 at connection points 47 and 49, respectively. Body wall 55 extends between proximal portion 46 and distal portion 51, so as to surround stem wall 32 and to define body interior 56. Connection point 47 is distal to valve core 34 and connection point 49 is at the distal end of stem wall 32.

Valve assembly damaging apparatus 50 is adapted to damage stem wall 32, body 35, and grommet 40, e.g. by puncturing, rupturing, cracking, or severing the same, following ignition of the engine of a motor vehicle by an unauthorized person. Following actuation of apparatus 50, an air passageway is formed between bore 36 and the exterior of valve assembly 25 via body interior 56, so that air deflates from the corresponding tire and deflates. Apparatus 50 is suitable for selectively damaging stem wall 32, body 35 and grommet 40 without damaging the tire rim.

Figure 3:
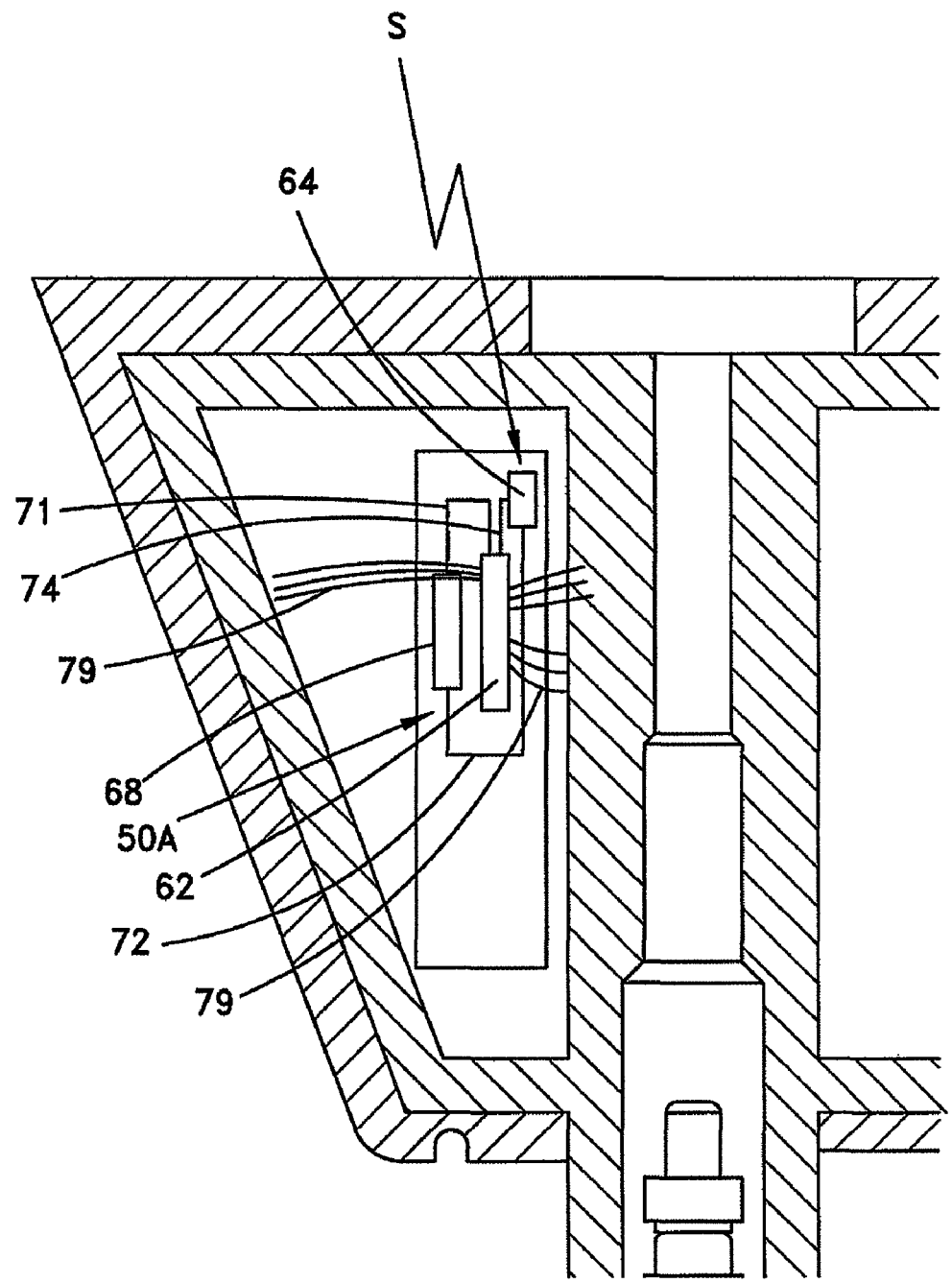
FIG. 3 is a cross-sectional view of a tire valve assembly, showing one embodiment of an activation device.

FIG. 3 schematically illustrates one embodiment of the valve assembly damaging apparatus. As shown, valve assembly damaging apparatus 50A comprises electric detonator 62, wireless switch 64, and battery 68 for powering detonator 62 and switch 64 by means of wires 71 and 72, respectively. After wireless switch 64 receives a suitable activation signal S, from the activation signal generator which will be described hereinafter, detonator 62 is triggered by means of wire 74 connecting detonator 62 and switch 64. Explosive force 79 generated by detonator 62 is then radiated therefrom. Detonator 62 is provided with a sufficiently small amount of explosive charge to rupture the valve stem, body and grommet without being able to damage the tire rim.

Figure 4:
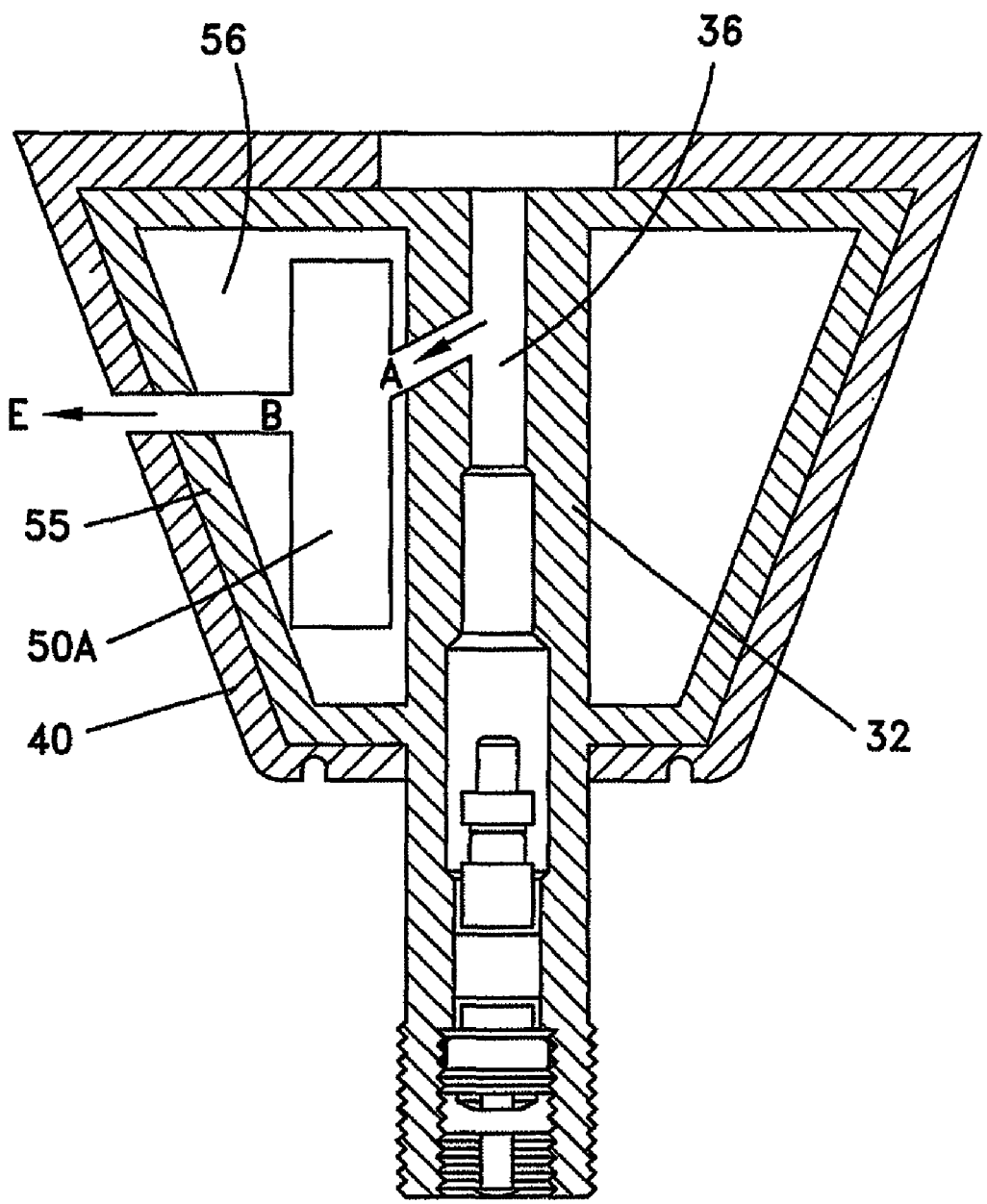
FIG. 4 is a cross-sectional view of a tire valve assembly, showing an air passageway that is formed following operation of an activation device.

After the detonator is triggered and damage is inflicted on the valve assembly, as shown in FIG. 4, air passageway A between bore 36 and body interior 56 is formed as a result of the ruptured valve stem 32. Likewise air passageway B between body interior 56 and exterior E of the valve assembly is formed as a result of the ruptured grommet 40 and body wall 55. Following formation of air passageways A and B by means of valve assembly damaging apparatus 50A, air is released from the tire via said air passageways, causing the corresponding tire to deflate and rendering the motor vehicle disabled. The damaged valve assembly may be easily removed from the tire rim and replaced by a new intact valve assembly.

Figure 5:
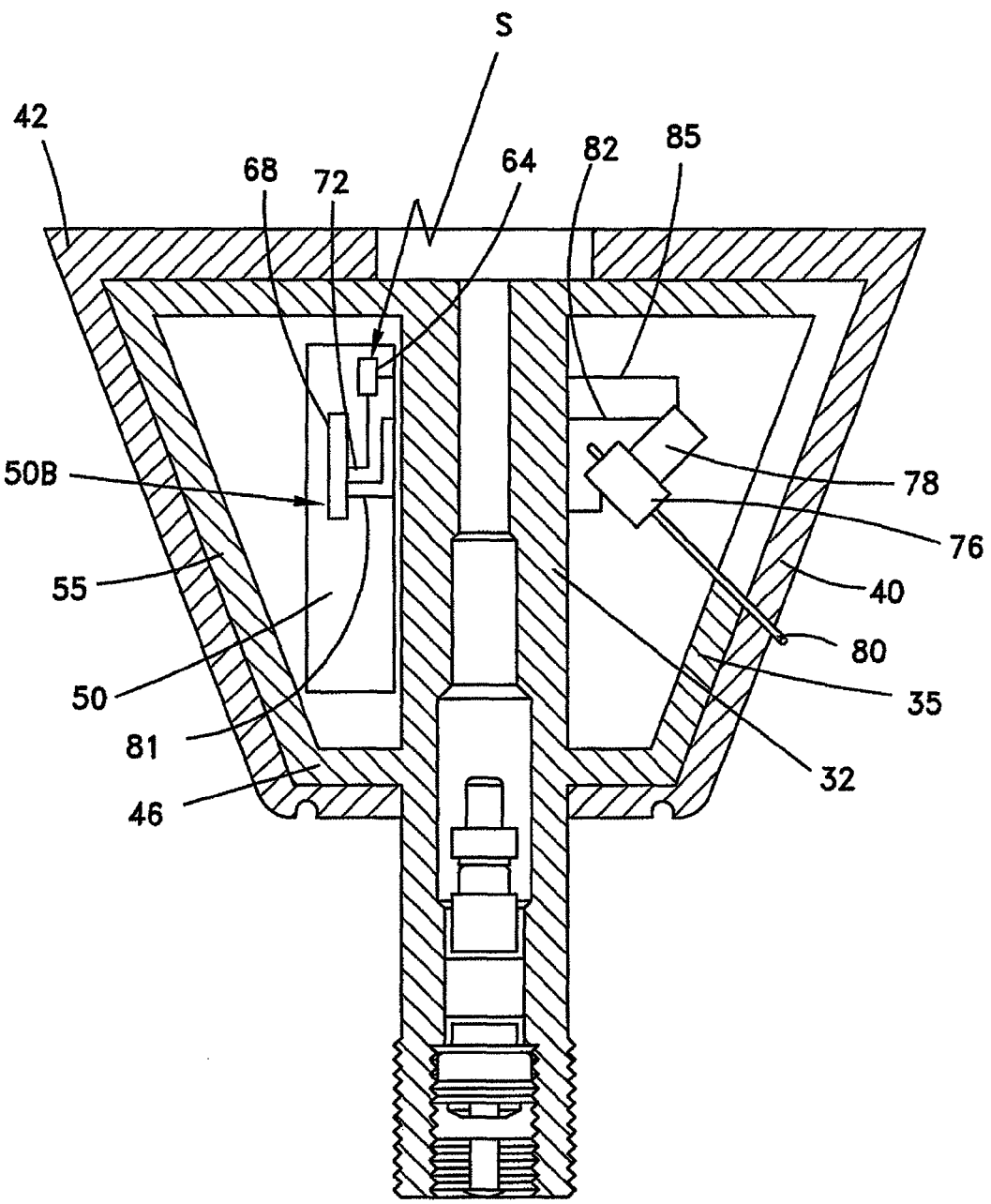
FIG. 5 is a cross-sectional view of a tire valve assembly, showing another embodiment of an activation device.

Another embodiment of the valve assembly damaging apparatus is illustrated in FIG. 5. As shown, valve assembly damaging apparatus 50B, which is preferably annular and housed within the interior of body 35, comprises bi-directional motor 76, electrically controlled actuator 78 for motor 76, sharpened bit 80 that is driven by motor 76, wireless switch 64, and battery 68 for powering switch 64, motor 76, and actuator 78 by means of wires 72, 81, and 82, respectively. Wireless switch 64 is in data communication with actuator 78 by means of wires 85.

Bit 80, e.g. a drill bit, is sufficiently long so that it is suitable to pierce body 35 and grommet 40 when fully extended in one direction and suitable to pierce stem wall 32 when fully extended in the opposite direction. After wireless switch 64 receives a suitable activation signal S from the activation signal generator, actuator 78 receives a command to initiate a predetermined control cycle by which motor 76 is operated to fully extend bit 80 in one direction and then in the opposite direction. Motor 76 is preferably a motor that operates sufficiently quickly such that the valve assembly is damaged and the corresponding tire is deflated before the motor vehicle leaves its parking space; however, motor 76 may also may be a slow-speed motor that causes tire deflation on route from the point of unauthorized motor vehicle access.

It will be appreciated that an activation device may comprise other types of apparatus (not shown) which are suitable for damaging the valve assembly to such a degree that air escapes from the corresponding tire, such as a pneumatically actuated guillotine for slicing the grommet and body, a heating element that can cause the grommet and body to melt, e.g. by means of a filament heated by the heating element, and means for releasing a chemical agent that is capable of damaging the valve assembly.

The chemical agent may be an acid, such as hydrochloric acid or sulfuric acid, retained in a container that does not react with the acid, e.g. polyethylene (PE), polystyrene (PS), polyethylene terephthalate (PET), reinforced glass, and stainless steel. The chemical agent is preferably sufficiently acidic to instantaneously damage the grommet and body, and of a sufficiently small volume that the valve assembly will be selectively damaged without damaging the tire or rim. The chemical agent may be released by means of electric detonator 62 (FIG. 3) or by opening an aperture formed in the container.

Alternatively, two separate chemical agents, an acid and a base, may be retained in the container, e.g. in capsule form, and separated by a partition, such as a membrane. The acid may be hydrochloric acid or sulfuric acid and the base may be potassium hydroxide or sodium hydroxide. Following unauthorized access to the motor vehicle, the acid and base react by an exothermic reaction to form a chemical compound to selectively damage the valve assembly. The amount of heat released by the exothermic reaction, which can be controlled, is preferably of a sufficiently high value to cause the grommet and body to instantaneously crack.

Figure 6:
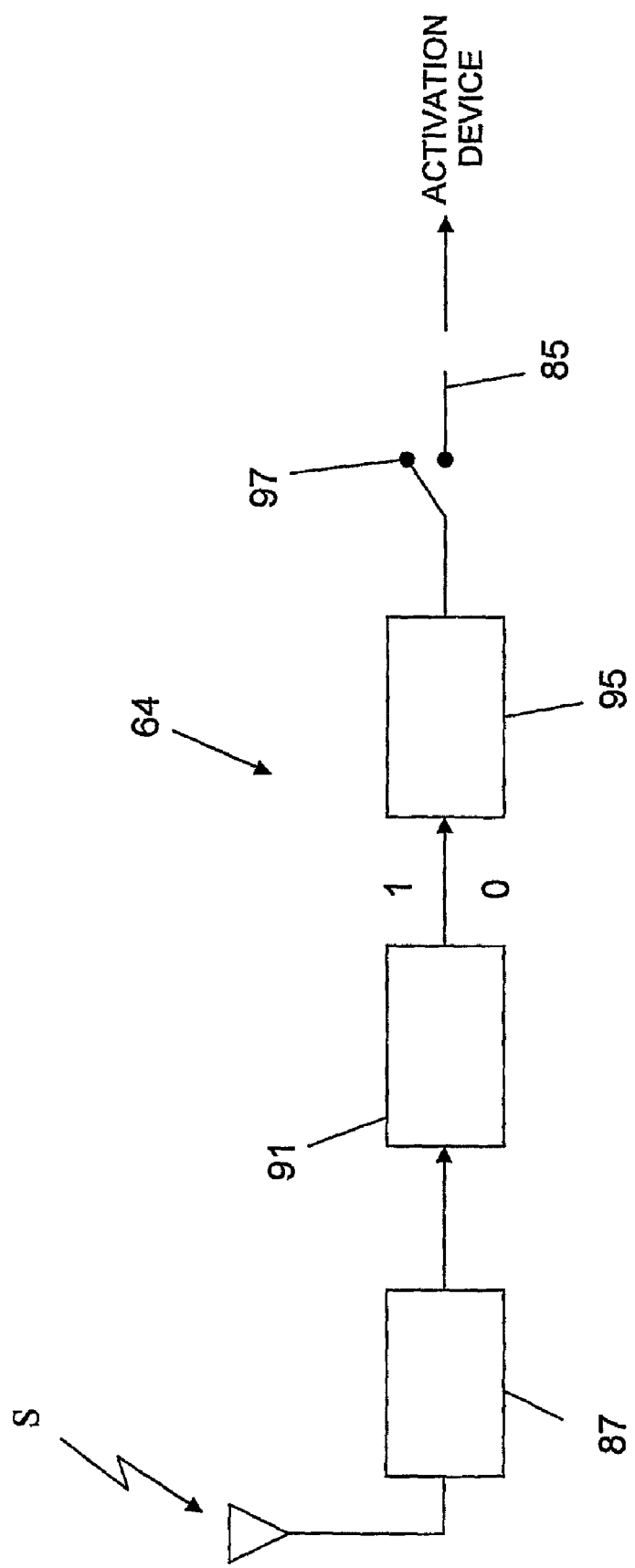
FIG. 6 is an exemplary block diagram of a wireless switch.

FIG. 6 illustrates an exemplary block diagram of wireless switch 64. Wireless switch 64 comprises Bluetooth receiver 87, which receives a wireless activation signal S from the activation signal generator, controller 91 for processing activation signal S and outputting a suitable binary command in response to the received activation signal S, switch driver 95, and switch 97 connected to wire 85 of an activation device of the valve assembly damaging apparatus. An activation device is one that initiates the operation of the valve assembly damaging apparatus, such as detonator 62 of FIG. 3 or actuator 78 of FIG. 5. When activation signal S is indicative that there has not been unauthorized access to the motor vehicle, controller 91 outputs a binary command of 0, indicating that the contacts of switch 97 are to remain open. When activation signal S is indicative that there has been unauthorized access to the motor vehicle, controller 91 outputs a binary command of 1, thereby commanding driver 95 to close the contacts of switch 97 and to initiate the operation of the activation device.

Figure 7:
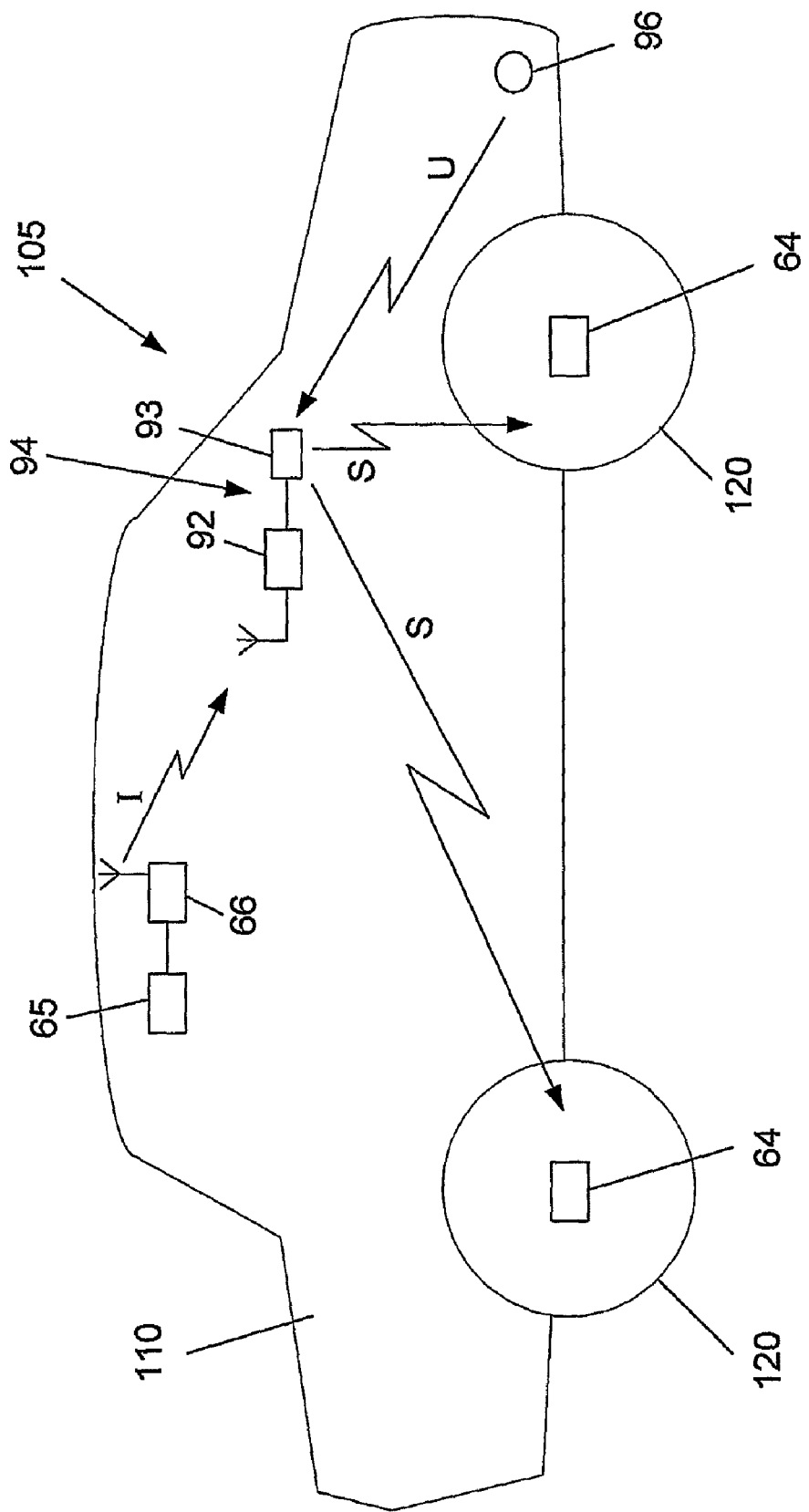
FIG. 7 is a schematic illustration of a system for deflating a tire, according to one embodiment of the invention.

FIG. 7 schematically illustrates a system 105 for deflating a plurality of tires following unauthorized access to a motor vehicle, in accordance with one embodiment of the invention. Tire deflating system 105 comprises activation signal generator 94 and a plurality of wireless switches 64, each of which is housed in a corresponding tire valve assembly of a corresponding tire 120. Activation signal generator 94 in turn comprises transceiver 92, processor 93, and one or more sensors 96 in communication with processor 93 for determining unauthorized access to motor vehicle 110. Sensor 66 may be a vehicle movement sensor, an engine ignition sensor, a vehicle vibration sensor, a tire rotation sensor, a sensor for detecting unauthorized detachment or removal of the vehicle anti-theft protection system, a sensor for detecting a predetermined vehicular speed, or any other suitable sensor. When two or more sensors are employed, each of the sensors may be a different type. An unauthorized access signal U is transmitted to processor 93 when the corresponding sensor 96 detects access to vehicle 110, e.g. engine ignition, movement of the vehicle, or the raising of the vehicle by a crane. Transceiver 92 and processor 93 may be centrally located, e.g. in close proximity to the ignition of motor vehicle 110. Alternatively, transceiver 92 and processor 93 may be attached to one of the tire rims. If so desired, processor 93 may be the on-board vehicle computer.

Activation signal generator 94 receives an input signal I from anti-theft protection system 65 of motor vehicle 110, which is well known to those skilled in the art. Input signal I is indicative of the state of protection system 65, whether in an armed state or a disarmed state. Protection system 65 is provided with a transmitter 66, by which input signal I is transmitted to transceiver 92 of activation signal generator 94. After an input signal I has been transmitted to transceiver 92, processor 93 receives input signal I. If input signal I is indicative that protection system 65 is in a disarmed state, an activation signal S will not be transmitted. If input signal I is indicative that protection system 65 is in an armed state, activation signal generator 94 is set to a standby mode. During the standby mode, processor 93 transmits a command to generate an activation signal S when a conflict is detected between the anticipated vehicular conditions of an armed state, when the motor vehicle should be stationary and not accessed, and the detected vehicular conditions after receiving an unauthorized access signal U. Accordingly, when generator 94 is in a standby mode, an activation signal S will be generated and subsequently transmitted to each wireless switch 64 by means of transceiver 92, following the transmission of an unauthorized access signal U from a sensor 96 to processor 93. As explained hereinabove, the operation of a valve assembly damaging apparatus is initiated after wireless switch 64 receives activation signal S due to unauthorized access to vehicle 110, as detected by one of the sensors 96, thereby causing the corresponding tires 120 to become deflated. It will be appreciated that system 105 is equally effective in disabling a vehicle when only one tire is provided with a self-damaging tire valve assembly of the present invention.

Activation signal generator 94 may be provided with suitable timing circuitry that emits an audible warning a predetermined time prior to the transmission of activation signal S, to provide the driver with an opportunity to neutralize the activation signal, e.g. with a remote control device.

Figure 9:
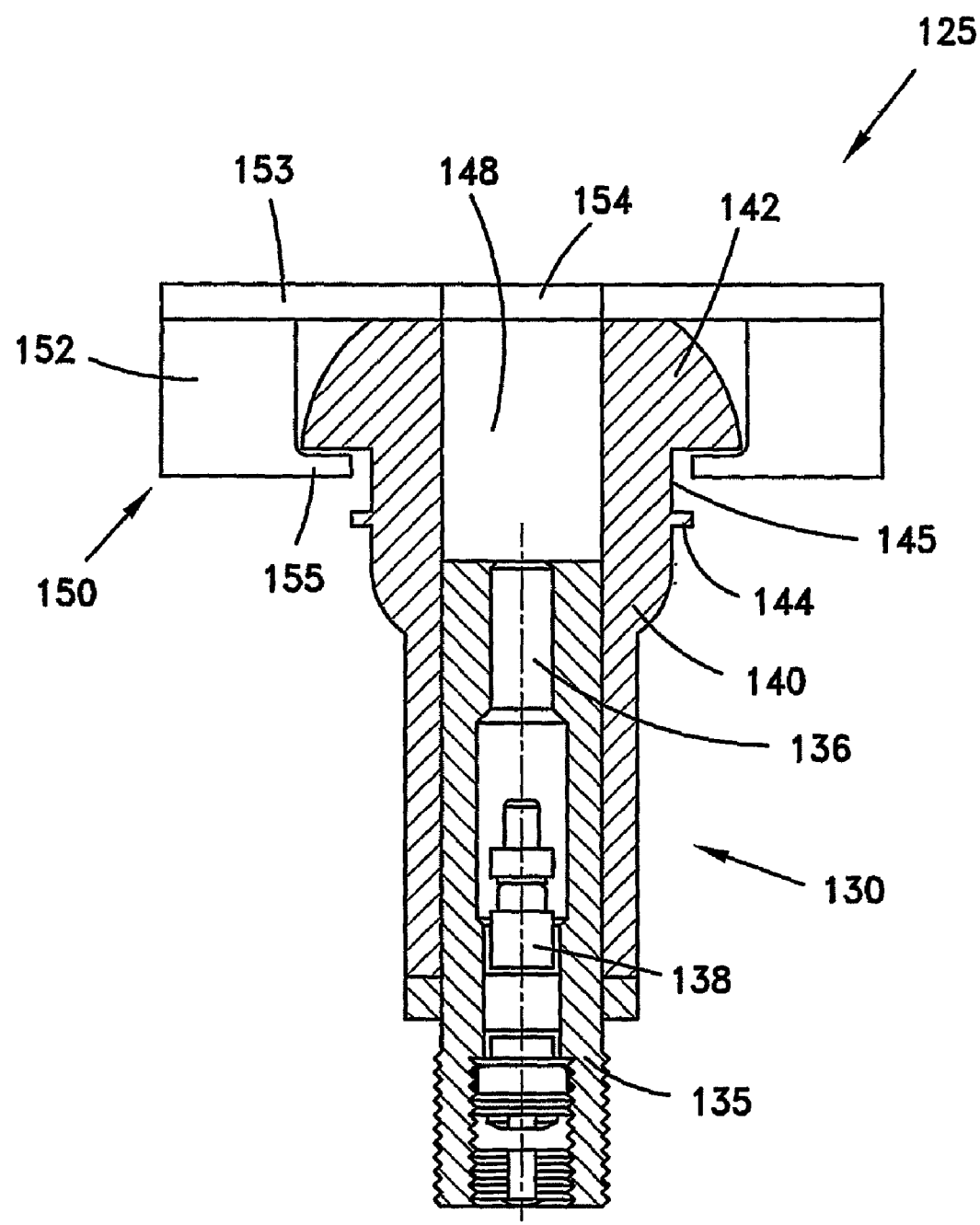
FIG. 9 is a cross-sectional, partially schematic view of a self-destructing tire valve assembly, according to another embodiment of the invention.

FIG. 9 is a cross-sectional and partially schematic view of another embodiment of a self-damaging valve assembly, which is designated by numeral 125. Self-damaging valve assembly 125 comprises valve assembly 130 and valve assembly damaging apparatus 150 mounted externally to valve assembly 130. By employing an externally mounted valve assembly damaging apparatus 150, the valve assembly damaging apparatus may be conveniently reused after a valve assembly 130 is damaged.

Valve assembly 130 is a commercially available valve assembly, comprising valve stem 135 longitudinally extending through the interior of the valve assembly, valve bore 136 through which tire inflating air is flowable, valve core 138 which is engaged with the interior of valve stem 135, and grommet 140 fixedly affixed to the exterior of valve stem 135. Grommet 140 has a curvilinear distal cap 142 longitudinally spaced from lip 144 by a recessed portion 145, and is formed with a central opening 148 in communication with valve bore 136.

The housing of valve assembly damaging apparatus 150 is annular, and has an outer portion 152 in which is housed the activation device and the wireless switch and an inner portion 155 internally protruding from, and having a significantly smaller thickness than, outer portion 152. Inner portion 155 of the valve assembly damaging apparatus housing is pressed onto the tire rim by curvilinear cap 142 in a secured fashion following the mounting of valve assembly 130. The inner diameter of inner portion 155 is greater than the outer diameter of lip 144 and is less than the outer diameter of cap 142. The activation device may be an electric detonator for rupturing valve assembly 130 without damaging the tire rim, a motor driven bit, guillotine, scissors, or annular cutting blade that is suitable for rotating a predetermined angular distance, e.g. 180 degrees, for permanently destroying valve assembly 130 such as by detaching curvilinear cap 142 from the remaining portion of grommet 140, or any other suitable means. A portion of outer portion 152 is formed with an aperture (not shown), which allows a suitable component of the activation device to be in damage inflicting communication with cap 142, so as to damage valve assembly 139 following generation of an activation signal. To prevent infiltration of dirt internally to valve assembly damaging apparatus 150, an annular cover plate 153 may attached to outer portion 152. Cover plate 153 is bored with an opening 154 having a diameter greater than valve bore 136.

Figure 10:
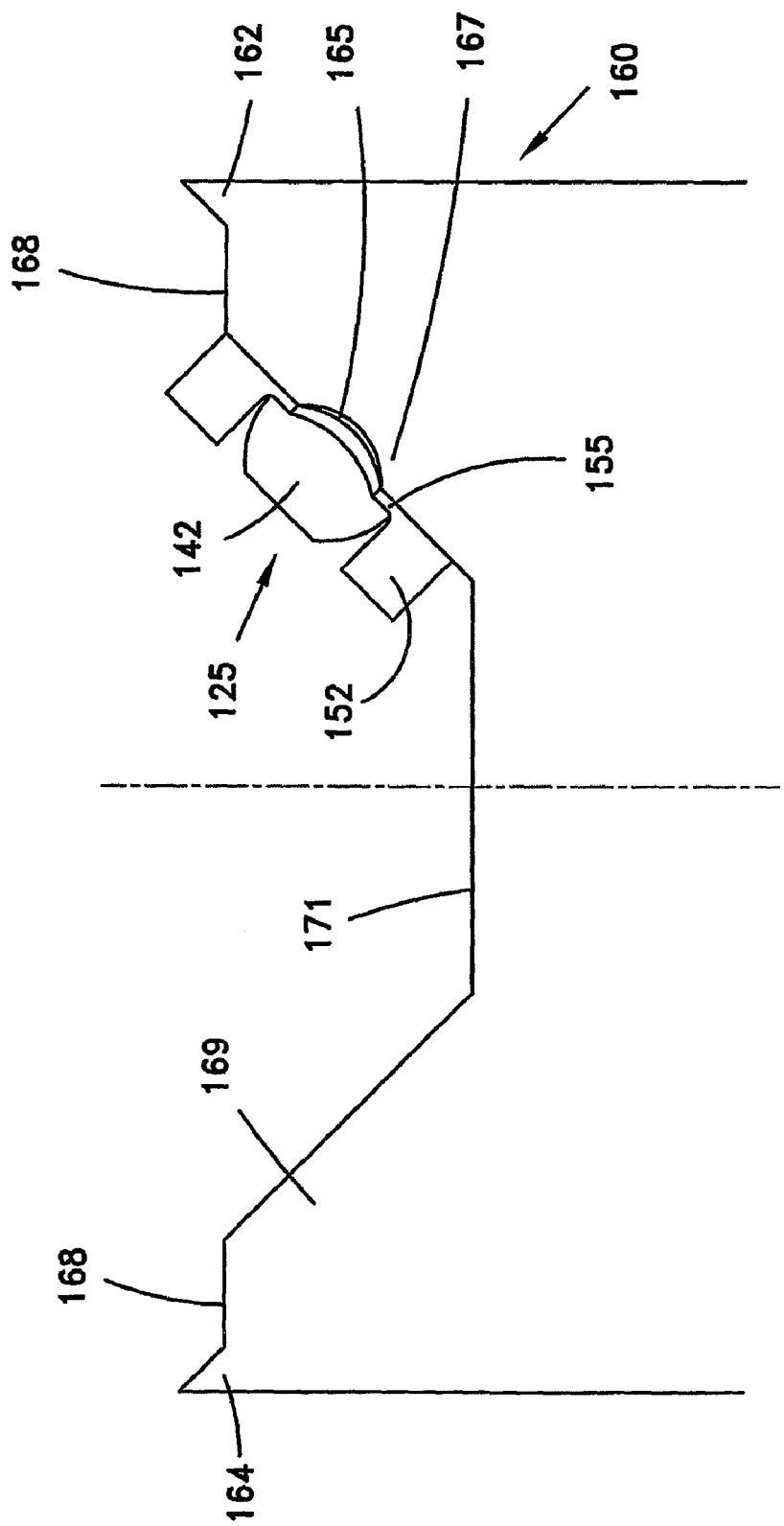
FIG. 10 is a schematic view of the self-destructing tire valve assembly of FIG. 8 when mounted in a tire rim.

FIG. 10 illustrates a self-damaging valve assembly 125 mounted on a tire rim 160. Commercially available tire rim 160 is manufactured with a rim surface interior facing the interior of a tire (not shown) when the tire is mounted on the rim. The rim surface interior has lips 162 and 164, annular humps 167 and 169, support surfaces 168 extending from a corresponding lip to an adjacent hump, and drop center 171 which is interposed between annular humps 167 and 169 and recessed with respect to support surfaces 168. The walls of a tire are mounted on support surfaces 168, and therefore drop center 171 is disposed within the interior of the tire.

Self-damaging valve assembly 125 is mounted on hump 167. The valve assembly is inserted within aperture 165 formed within hump 167 such that cap 142 protrudes outwardly from hump 167. In order to mount self-damaging valve assembly 125 on hump 167, the valve assembly damaging apparatus is first placed on hump 167 in such a way that the central opening of inner portion 155 is coincident with aperture 165 formed within hump 167. Valve assembly 130 (FIG. 9) is then inserted by a press fit into aperture 165 until lip 144 contacts hump 167, thereby causing cap 142 to apply pressure onto inner portion 155 and to secure the valve assembly damaging apparatus to tire rim 160. Outer portion 152 of the valve assembly damaging apparatus housing is configured so as not to interfere with the interior tire wall as the tire is mounted on tire rim 160. Following generation of the activation signal, the valve assembly damaging apparatus is suitable for selectively damaging cap 142 without damaging tire rim 160 to such a degree that air escapes from the tire.

Figure 11:
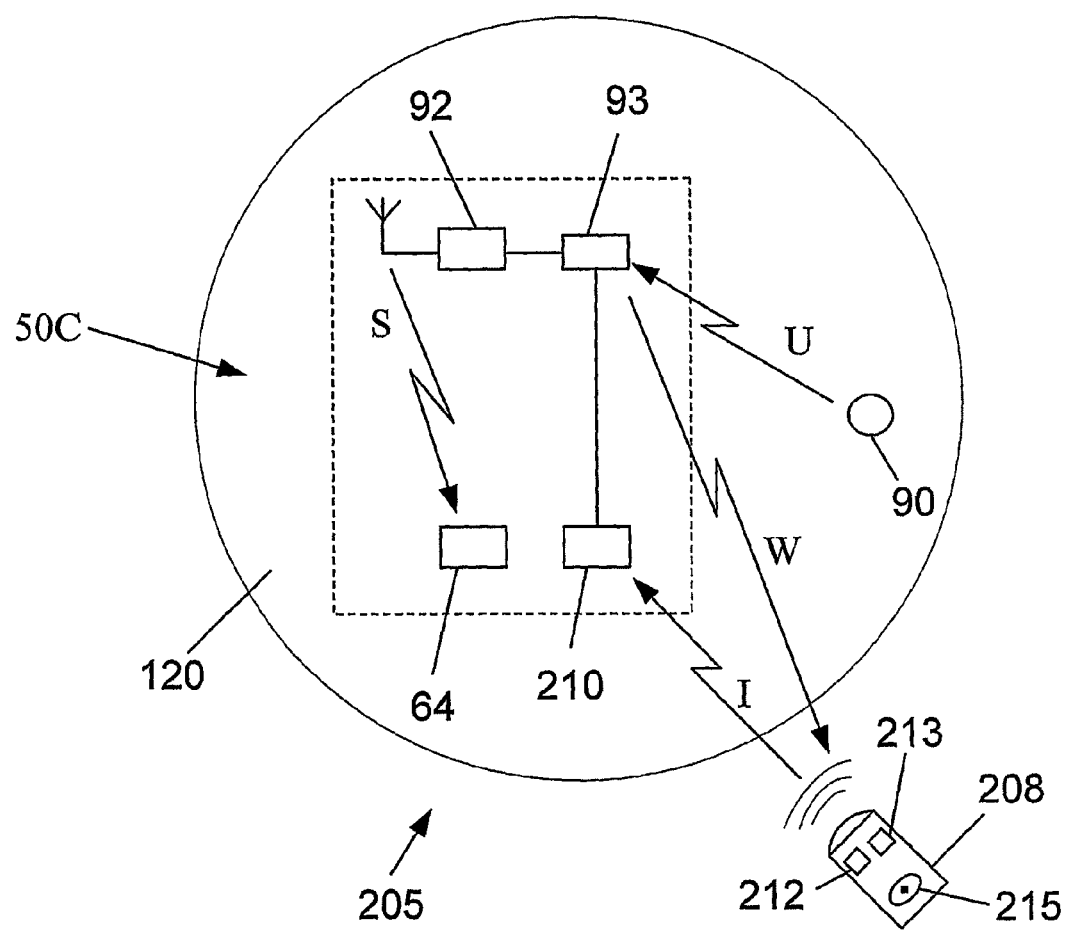
FIG. 11 is a schematic illustration of a system for deflating a tire, according to another embodiment of the invention.

FIG. 11 schematically illustrates a system 205 for deflating a plurality of tires following unauthorized access to a motor vehicle, in accordance with another embodiment of the invention. System 205 comprises valve assembly damaging apparatus 50C, which is associated with the valve assembly of tire 120. Valve assembly damaging apparatus 50C comprises transceiver 92, processor 93, wireless switch 64, rotation sensor 96, immobilizer 210, and remote control device 208. An immobilizer is well known to those skilled in the art of ant-theft protection systems, and need not be described, for brevity. An activation signal generator, which comprises at least transceiver 92 and processor 93, may be locally mounted on each tire rim, whether internally or externally to the corresponding valve assembly, as shown, or one central activation signal generator may be mounted at a convenient location within the vehicle.

In this embodiment, system 205 does not receives its input signal from an anti-theft protection system, but rather remote control device 208 transmits coded input signal I to immobilizer 210 in wireless fashion. After the motor vehicle is parked, the user transmits input signal I to immobilizer 210 which is in data communication with processor 93 by depressing button 212, so that valve assembly damaging apparatus 50C will be set to an armed state. An input signal I is sequentially transmitted for each valve assembly damaging apparatus provided with the motor vehicle. When the user is desirous of driving once again, another input signal I is transmitted to immobilizer 210 by depressing button 213, so that valve assembly damaging apparatus 50C will be set to a disarmed state. However, if rotation sensor 90 detects that the rim of tire 120 is rotating, such as during an attempt of thievery, when processor 93 is in a standby mode, unauthorized access signal U will be transmitted to processor 93. Processor 93 will then command transceiver 92 to transmit activation signal S to wireless switch 64, to initiate a tire deflating operation.

The activation signal generator may be optionally provided with suitable timing circuitry (not shown) that emits an audible warning signal W at a predetermined time prior to the transmission of activation signal S, to provide the driver with an opportunity to neutralize the activation signal. Warning signal W is transmitted to remote control device 208, which is provided with a transceiver (not shown) and an enunciator 215. Remote control device 208 is preferably retained in close proximity to the driver, so that he may hear warning signal W and be able to neutralize activation signal S before the predetermined time elapses.

Figure 8:
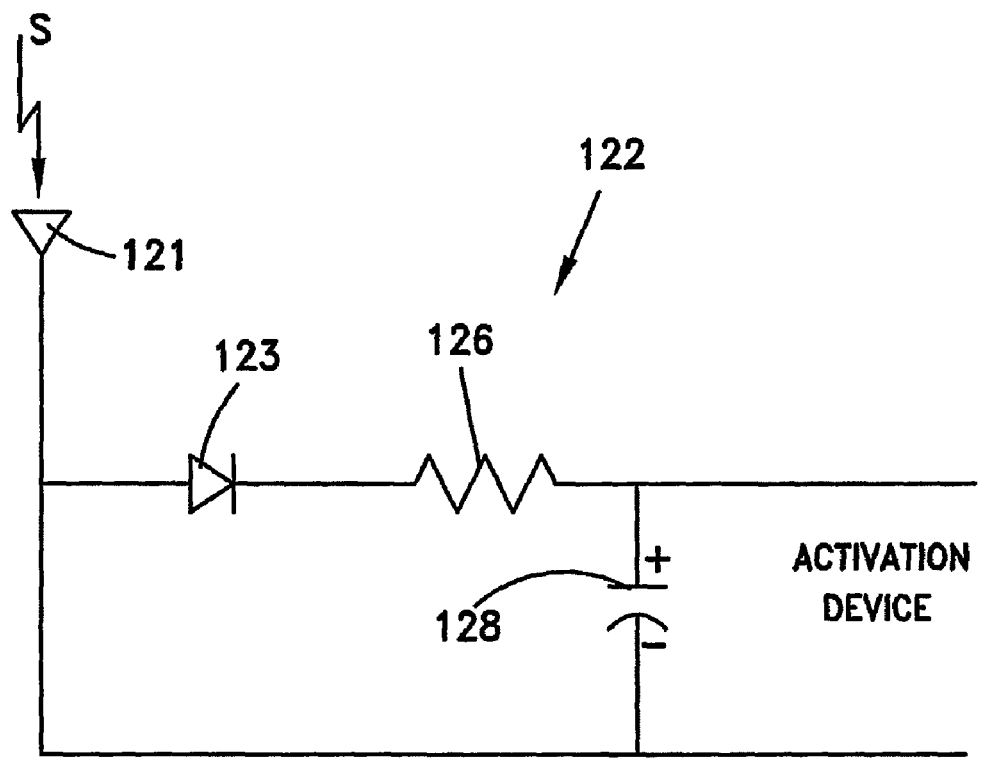
FIG. 8 is an illustration of a rectified excitation circuit suitable for powering an activation device.

In the embodiment of the invention shown in FIG. 8, the valve assembly damaging apparatus may be powered by a rectified excitation circuit. Rectified excitation circuit 122 comprises antenna 121 for receiving activation signal S, diode 123 connected to antenna 121, resistor 126 connected to diode 123, and capacitor 128, which is connected to the activation device, to antenna 121, and to resistor 126. In this embodiment, the activation signal is a relatively high-powered radio frequency (RF) signal of approximately 1 W. After a pulse of RF waves, e.g. having a period of 0.1 sec, is transmitted to antenna 121, the half waves of the transmitted pulse are rectified to a substantially constant voltage amplitude. Capacitor 128 is thereby charged to said substantially constant voltage amplitude, and shortly thereafter is discharged, whereby to power the activation device for a sufficiently short duration which is suitable for initiating a valve assembly damaging operation. By employing a valve assembly having a rectified excitation circuit, the need for replacing batteries is obviated.

The valve assembly damaging apparatus may comprise a switch in wired connection with the processor of a centrally located activation signal generator. As is well known to those skilled in the art, a flexible contact may be used to conduct electricity from the stationary processor to the wired switch which is mounted on the rotating tire rim.

Figure 12:
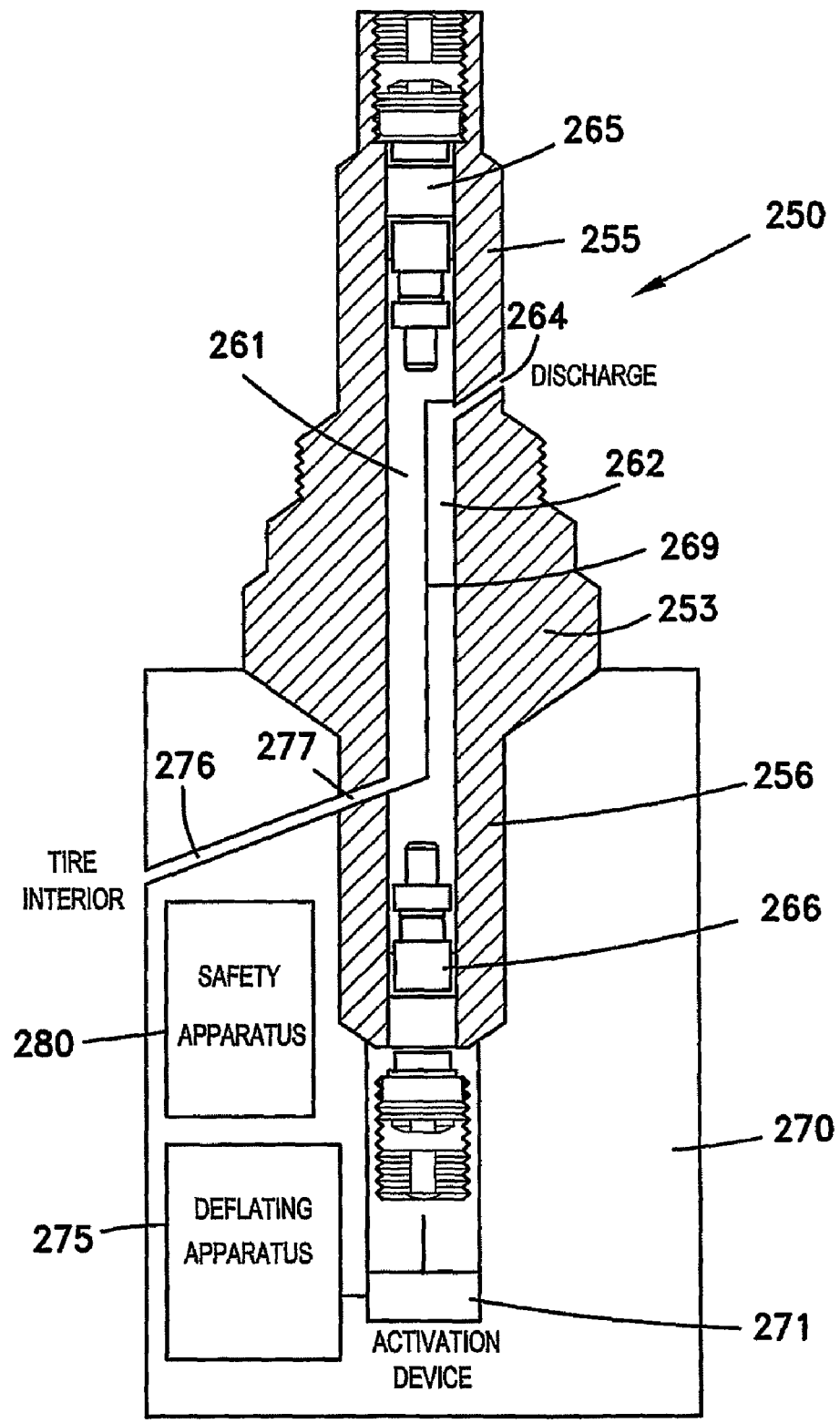
FIG. 12 is a cross-sectional, partially schematic view of a tire valve assembly having two air passageways and actuated by a tire deflating apparatus, according to another embodiment of the invention.

In another embodiment of the invention, FIG. 12 illustrates a valve assembly designated by numeral 250 which is adapted to deflate a tire upon unauthorized access to the motor vehicle without causing damage to the valve assembly. Valve assembly 250 comprises grommet 253 adapted to contact a tire rim when the valve assembly is inserted within a factory-produced aperture formed within the rim, and valve stems 255 and 256 longitudinally extending in opposite directions from grommet 253. Grommet 253 may be integrally formed with valve stems 255 and 256 as shown, or may be a separate component. A central bore of a uniform diameter longitudinally extending throughout the entire interior of the valve assembly is divided by partition 269 into two air passageways 261 and 262. Within the two longitudinal ends of the bore, valve cores 265 and 266, respectively, are mounted in opposite orientation, engaging the interior of stems 255 and 256, respectively. Valve core 265 is configured to protrude from the tire mounted on the tire rim, and is adapted to permit the introduction of air to the tire interior via passageway 261 when actuated and to prevent the discharge of air from the tire interior when not actuated. Valve core 266 is adapted to permit the discharge of air externally to the tire from the tire interior via primary passageway 262 and secondary passageway 264, which is formed within a wall of valve stem 255 and is in communication with primary passageway 262, when actuated and to prevent the discharge of air when not actuated.

Housing 270 for schematically illustrated tire deflating apparatus 275 is annular and is externally mounted to valve assembly 250. Housing 270 is formed with conduit 276 or any other suitable opening in communication with the tire interior and with secondary passageway 277 formed within a wall of valve stem 256, to allow the tire to be inflated. Housing 270 is also formed with an opening in communication with air passageway 262 (not shown), to allow the tire to be deflated. Tire deflating apparatus 275 comprises activation device 271 kinematically connected with valve core 266 and actuating means therefor, as well as a wireless switch and a power source. Activation device 271 may be an axially displaceable element such as a plunger. Upon unauthorized access to the motor vehicle, an activation signal for activating activation device 271 is transmitted to the switch, thereby actuating valve core 266. Air is therefore discharged from the tire interior through opened passageway 262 and the tire becomes deflated.

It will be appreciated that an occluding element, rather than a unidirectional valve, may be installed within the discharge passageway 262. As an activation signal is transmitted to the wireless switch, the activation device kinematically connected with the occluding element displaces the latter, to open passageway 262 and to permit the tire to be deflated.

Due to the compact configuration of the apparatus by which valve stem 255, grommet 253 and the central bore of valve assembly 250 have the same general configuration and dimensions as commercially available valve assemblies, the two valve cores 265 and 266 are longitudinally aligned, and housing 270 having a width only slightly larger than grommet 253 is externally mounted to, and in abutting relationship with, valve assembly 250, valve assembly 250 may be advantageously fitted within a factory-produced aperture of a tire rim without have to machine another aperture with the tire rim, as has been the practice heretofore with respect to prior art tire deflating apparatus.

Housing 270 may also comprise safety apparatus 280, for preventing the operation of activation device 271 while the motor vehicle is in transit. Safety apparatus 280 comprises a vehicle movement sensor and a vehicle vibration sensor connected in parallel to a controller. When the controller receives a disable signal from one of these sensors indicating that the motor vehicle is in transit, a switch in communication with the controller and connected in series to switch 97 of the wireless switch and to wire 85 of the activation device (FIG. 6) is forced to remain open, thereby preventing operation of activation device 271. Thus a driver of the motor vehicle need not be concerned that one of the tires will be deflated by accidental operation of the activation device while the motor vehicle is in transit. Alternatively, the disable signal may be transmitted from the main motor vehicle computer, for example in conjunction with the movement and vibration sensors or with the anti-theft protection system of the motor vehicle.

The disable signal may be transmitted a predetermined time period following the detection of movement of the motor vehicle. Alternatively, the disable signal is automatically transmitted a second predetermined time period following a first predetermined time period during which a user must transmit a coded input signal to immobilizer 210 (FIG. 11) to set tire deflating apparatus 275 to a disarmed state after being in an armed state.

It will be appreciated that safety apparatus 280 may be used in conjunction with any of the other embodiments of the invention.

Figure 13A:
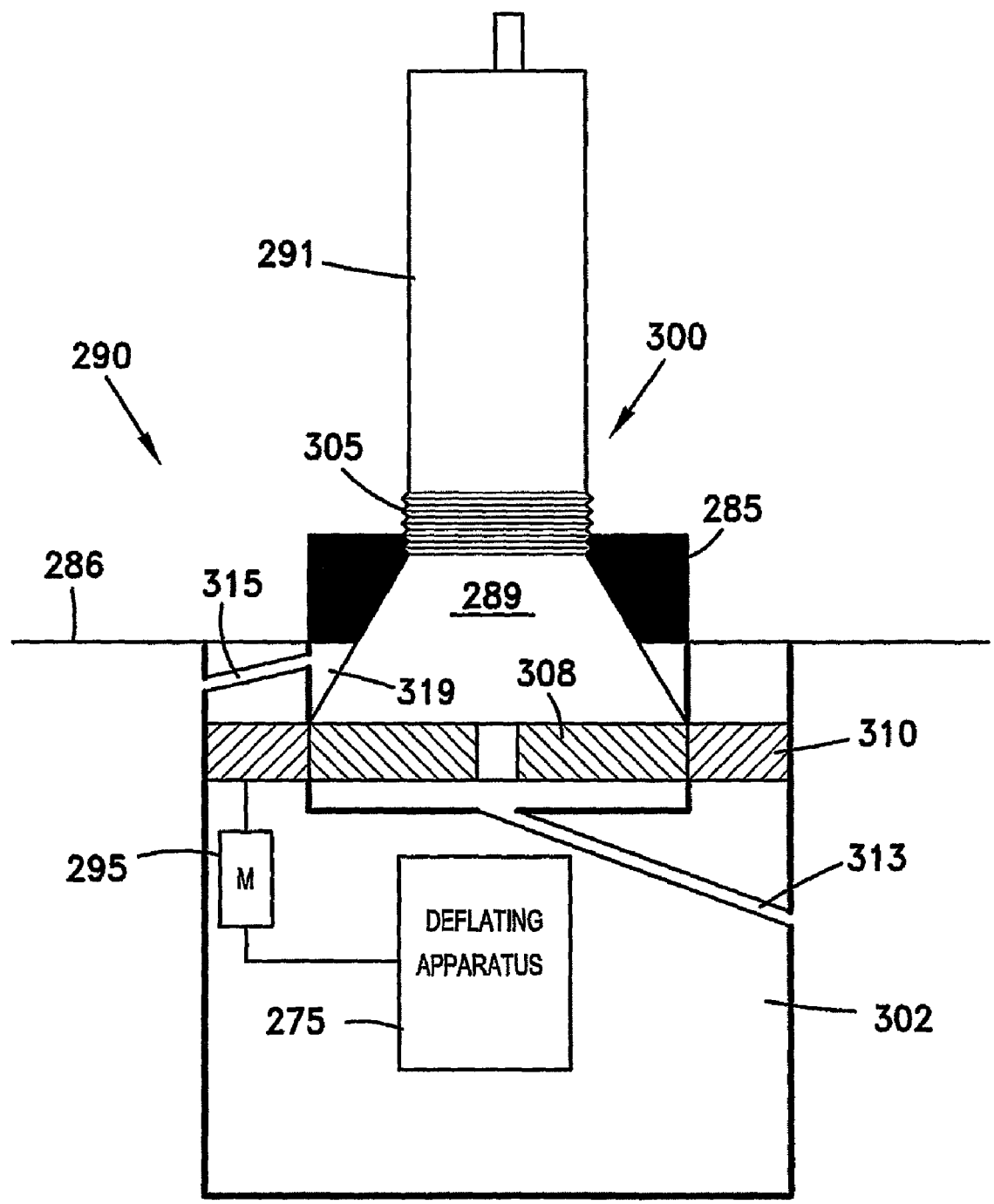
FIGS. 13a-b are schematic illustrations shown partially in vertical cross section of another embodiment of apparatus suitable for deflating a tire, wherein the valve assembly is in its normal disposition in FIG. 13a and is in a lowered disposition in FIG. 13b.
Figure 13B:
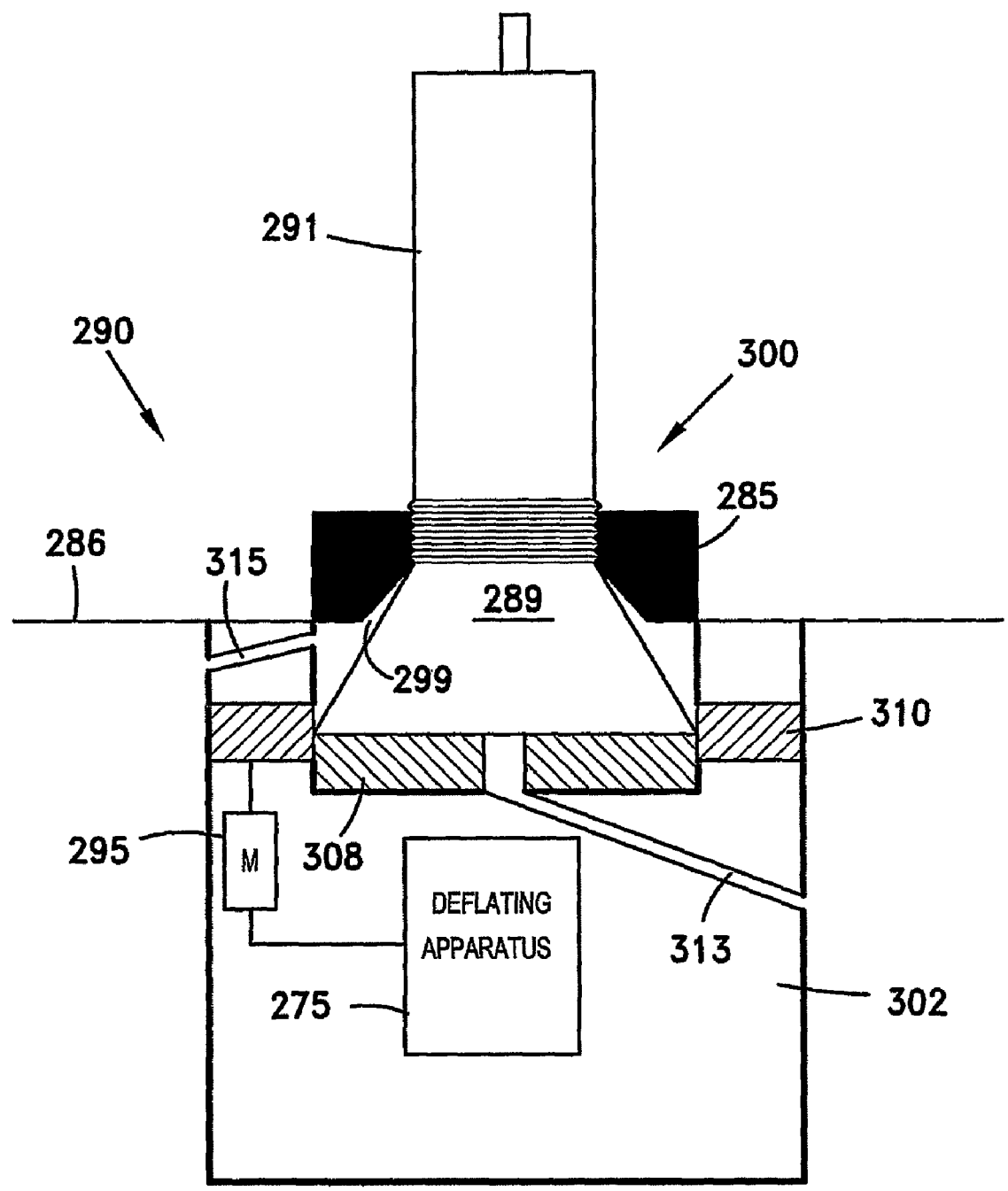

In the embodiment of FIGS. 13a-b, apparatus 290 is adapted to deflate air from a tire following unauthorized access to the motor vehicle by rotating valve assembly 300 by means of gear 310, which is kinematically connected to valve assembly 300 and driven by motor 295. The illustrated outer gear 310 is annular, but it will be appreciated that any other suitable configuration of the kinematic connection with valve assembly 300 is also applicable.

Valve assembly 300 comprises metallic valve stem 291 formed with external threading 305, a valve core (not shown) installed within the bore of stem 291, and a conical grommet 289. Inner gear 308 is attached to the underside of grommet 289, and is engageable with outer gear 310. Nut 285 is threadedly engaged with threading 305 of valve stem 291, and serves to press grommet 289 onto rim 286, to prevent air leakage from the tire interior.

Housing 302, which is longitudinally separated from, and has a width only slightly larger than, grommet 289, contains outer gear 310, motor 295 and deflating apparatus 275 comprising a wireless switch and a power source, e.g. a long-lasting lithium battery. Housing 302 is formed with two air passageways 313 and 315. Passageway 313, through which air flows when the tire is inflated, is in communication with the central bore of valve assembly 300, a aperture formed in inner gear 308, and with the tire interior. Passageway 315, through which air flows when the tire is deflated, is in communication with gap 319 between grommet 289 and the tire interior. When grommet 289 is pressed in sealing relationship with rim 286 and deflating apparatus 275 is not activated, as shown in FIG. 13a, air leakage from the tire interior through passageway 315 and the factory-produced rim aperture is prevented.

Upon unauthorized access to the motor vehicle, motor 295 is activated by means of deflating apparatus 275. As a result, outer gear 308 is driven, causing inner gear 310 and valve assembly 300 to rotate. As valve assembly 300 rotates downwardly due to the influence of nut 285, as shown in FIG. 13b, grommet 289 ceases to be in sealing relationship with factory-produced aperture 299 of rim 286. Air is therefore discharged from the tire interior through passageway 315 and aperture 299, and the tire therefore becomes deflated. In order to reinflate the tire, valve stem 291 may be manually rotated until grommet is once again in sealing relationship with rim 286, or motor 295 may be activated to rotate in the opposite direction by a suitable signal.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A tire valve apparatus or deflating a tire following unauthorized access to a motor vehicle, comprising:
 a. a single valve assembly adapted to both introduce air into the tire interior and to release air therefrom, when desired, and including a valve stem insertable within a single factory-produced rim aperture; and
 b. means for deflating said tire following unauthorized access to a motor vehicle wherein said tire valve apparatus is a self-damaging tire valve apparatus;
 wherein said deflating means comprises:
 c. damaging apparatus being disposed in damage inflicting communication with said valve assembly and being adapted to be retained within said tire interior,
 wherein said valve assembly is capable of being damaged to such a degree by said damaging apparatus that air escapes from a corresponding tire, said damaging apparatus being activatable in response to transmission of an unauthorized access signal from sensor means upon detection of unauthorized access of said motor vehicle.

2. The tire valve apparatus according to claim 1, comprising:
 a) an elongated valve stem having a stem wall longitudinally extending through the valve assembly and an externally threaded portion at a proximal end of said stem wall which is engageable with a removable closure cap, said stem wall being formed with a bore through which air is flowable;
 b) a valve core engaged with the interior of said stem wall adjacent to said externally threaded portion;

c) a grommet disposed externally with respect to said stem wall and provided with an enlarged distal portion which is formed with a central opening in communication with said bore, said grommet being adapted to contact an interior surface of a tire rim in sealing relationship when said valve stem is mounted in the single factory-produced aperture of the rim; and d) the damaging apparatus is housed within, or mounted externally to, a valve assembly body and is adapted, following generation of an activation signal upon access to a motor vehicle by an unauthorized person, to selectively damage said body and said grommet, without damaging the tire or tire rim, to such a degree that air escapes from the corresponding tire.

3. The tire valve apparatus according to claim 2, wherein the damaging apparatus housed within, or mounted externally to, the valve assembly body comprises an activation device for selectively damaging the body and grommet when activated, a switch in communication with said activation device, and means for powering said activation device and/or said switch, said switch being adapted for receiving the activation signal and for activating said activation device following reception of said activation signal.

4. The tire valve apparatus according to claim 3, wherein the switch is a wireless switch.

5. The tire valve apparatus according to claim 4, further comprising safety apparatus in communication with the wireless switch for preventing the operation of the activation device while the motor vehicle is in transit.

6. The tire valve apparatus according to claim 5, wherein the safety apparatus comprises a vehicle movement sensor or a vehicle vibration sensor connected to a controller, said controller adapted to receive a disable signal from one of said sensors or both of said sensors indicating that the motor vehicle is in transit and to thereinafter force a switch in communication with the wireless switch to remain open, thereby preventing operation of the activation device.

7. The tire valve apparatus according to claim 3, wherein the activation device comprises an electric detonator which is suitable for generating a suitable explosive force that can rupture the corresponding tire valve assembly without damaging the corresponding tire rim.

8. The tire valve apparatus according to claim 3, wherein the damaging apparatus comprises a motor, an actuator for said motor in data communication with the switch, and a bit driven by said motor for piercing the body and grommet.

9. The tire valve apparatus according to claim 8, wherein the motor is bi-directionally operational and the bit is sufficiently long so as to be able to pierce the body and grommet when fully extended in one direction and to be able to pierce the stem wall when fully extended in the opposite direction.

10. The tire valve apparatus according to claim 3, wherein the activation device comprises a pneumatically actuated guillotine for slicing the grommet and body.

11. The tire valve apparatus according to claim 2, wherein the valve assembly body is a hollow body in which the damaging apparatus is housed and to the exterior of which the grommet is fixedly affixed, said hollow body surrounding and integrally formed with the stem wall and extending outwardly from the stem wall at a connection point which is disposed distally with respect to the externally threaded portion.

12. The tire valve apparatus according to claim 3, wherein the grommet is fixedly affixed to the stem wall and the damaging apparatus has an annular housing mounted externally to the grommet, said annular housing being provided with an outer portion in which is housed the activation device and the switch and an inner portion securable to the tire rim by the enlarged distal portion of the grommet upon mounting of the valve assembly onto the tire rim, said inner portion internally protruding from, and having a significantly smaller thickness than, said outer portion.

13. The tire valve apparatus according to claim 12, wherein a portion of the outer portion of the annular housing is formed with an aperture through which a suitable component of the activation device is in damage inflicting communication with the valve assembly following generation of the activation signal.

14. The tire valve apparatus according to claim 3, wherein the means for powering the activation device and/or switch is a battery.

15. The tire valve apparatus according to claim 3, wherein the means for powering the activation device and/or switch is a rectified excitation circuit.

16. The tire valve apparatus according to claim 3, wherein the activation device comprises a heating element for melting the grommet and body.

17. The tire valve apparatus according to claim 3, wherein the activation device comprises means for releasing a chemical agent that is capable of damaging the valve assembly to such a degree that air escapes from the corresponding tire.

18. The tire valve apparatus according to claim 1, wherein the damaging apparatus is reusable after the valve assembly is damaged.

19. A system for deflating a tire following unauthorized access to a motor vehicle, comprising:

a) a single valve assembly adapted to both introduce air into a tire interior and to release air therefrom, when desired, said valve assembly being insertable within a single factory-produced aperture of a corresponding tire rim and comprising a body and grommet affixed to the exterior of said body;

b) means for deflating said tire following unauthorized access to a motor vehicle;

c) at least one sensor for detecting unauthorized access to said motor vehicle and for transmitting an unauthorized access signal;

d) means for actuating said deflating means in response to said unauthorized access signal;

e) an activation signal generator comprising a processor which is suitable for receiving an input signal indicating whether said vehicle is in an armed or disarmed state, for receiving said unauthorized access signal from said at least one sensor following unauthorized access of said vehicle, and for transmitting an activation signal to said actuating means following reception of said unauthorized access signal when said motor vehicle is in an armed state, wherein said deflating means comprises:

f) damaging apparatus being disposed in damage inflicting communication with said valve assembly and adapted to be retained within said tire interior;

g) an activation device housed within said damaging apparatus for selectively damaging, when activated, said body and grommet without damaging the tire rim to such a degree that air escapes from the corresponding tire;

h) a switch housed within said damaging apparatus for receiving said activation signal, said switch being in communication with said activation device and adapted to actuate said activating device following reception of said activation signal; and i) means for powering said activation device and/or said switch, said powering means being housed within said damaging apparatus.

20. The system according to claim 19, wherein the input signal is received from an anti-theft protection system of the motor vehicle.

21. The system according to claim 20, wherein when the motor vehicle comprises a plurality of damaging apparatuses, one activation signal generator is suitable for transmitting a corresponding activation signal to each damaging apparatus.

22. The system according to claim 19, wherein the input signal is transmitted by a remote control device to an immobilizer in communication with the processor.

23. The system according to claim 22, wherein when the motor vehicle comprises a plurality of damaging apparatuses, each damaging apparatus of the motor vehicle comprises a corresponding activation signal generator.

24. The system according to claim 19, wherein the activation signal generator is suitable for transmitting an audible warning signal to the remote control device at a predetermined time prior to the transmission of the activation signal.

25. The system according to claim 19, wherein the processor is an on-board computer.

26. The system according to claim 19, wherein the at least one sensor is selected from the group consisting of vehicle movement sensor, engine ignition sensor, vehicle vibration sensor, tire rotation sensor, sensor for detecting unauthorized detachment or removal of a vehicle anti-theft protection system, sensor for detecting a predetermined vehicular speed, or a combination thereof.

27. Tire valve apparatus for deflating a tire following unauthorized access to a motor vehicle, comprising:
   a) a single tire valve assembly adapted to both introduce air into a tire interior and to release air therefrom, when desired, said tire valve assembly comprising a grommet in sealing relationship with said rim to prevent the discharge of air from said rim aperture and a valve stem insertable within a single factory-produced rim aperture; and
   b) means for deflating said tire following unauthorized access to a motor vehicle, wherein said means for deflating comprises:
   c) a tire deflating apparatus disposed in damage inflicting communication with said valve assembly or kinematically connectable therewith to thereby deflate said tire, said tire deflating apparatus being activatable in response to transmission of an unauthorized access signal from sensor means upon detection of unauthorized access of said motor vehicle; and
   d) a housing in which said tire deflating apparatus is contained, said housing being externally mounted onto said valve assembly and adapted to be retained within said tire interior.

28. The tire valve apparatus according to claim 27, wherein the housing is only slightly wider than the grommet.

29. The tire valve apparatus according to claim 27, wherein the tire deflating apparatus comprises an activation device kinematically connectable with the valve assembly for causing air to be deflated from a tire when activated, a wireless switch in communication with said activation device, and means for powering said activation device and/or said switch, said switch being adapted for receiving a suitable activation signal and for activating said activation device following reception of said activation signal.

30. The tire valve apparatus according to claim 29, wherein the valve assembly comprises first and second valve stems longitudinally extending in opposite directions from the grommet, a central bore longitudinally extending throughout the entire interior of said valve assembly which is divided into first and second air passageways, a first valve core mounted within said first passageway and engaging the interior of said first stem, an occluding element mounted within said second passageway and engaging the interior of said second stem,
   wherein said first valve core is adapted to permit the introduction of air to the tire interior via said first passageway when actuated and to prevent the discharge of air from the tire interior when not actuated and said occluding element is adapted to permit the discharge of air externally to the tire from the tire interior via said second passageway when actuated and to prevent the discharge of air when not actuated,
   wherein the activation device which is capable of contacting said occluding element is adapted to displace the occluding element and to permit the flow of air through said second passageway.

31. The tire valve apparatus according to claim 30, wherein the occluding element is a second valve core mounted in opposite orientation as the first valve core, said second valve core being actuatable by means of the activation device following the transmission of an activation signal to the wireless switch to permit the tire to be deflated.

32. The tire valve apparatus according to claim 29, wherein the valve assembly comprises a valve stem formed with external threading, a valve core installed within a bore formed within said stem, a conical grommet, a nut threadedly engaged with said valve stem threading and adapted to press said grommet onto the rim to prevent air leakage from the tire interior, and a first gear in engagement with, or connected to, a component of the valve assembly, and in engagement with a second gear driven by a motor which is disposed within the housing,
   wherein said motor is operable following transmission of the activation signal, causing the valve assembly to be displaced towards the tire interior and to expose the rim aperture,
   whereby to deflate the tire.

33. The tire valve apparatus according to claim 29, further comprising safety apparatus in communication with the wireless switch for preventing the operation of the activation device while the motor vehicle is in transit.

* * * * *